US006634578B1

(12) United States Patent
Khalfan et al.

(10) Patent No.: US 6,634,578 B1
(45) Date of Patent: Oct. 21, 2003

(54) PAPER SEPARATION AND SINGULATION APPARATUS AND METHOD

(75) Inventors: Zaheer Khalfan, Scarborough (CA); Sheldon Greenspan, Toronto (CA)

(73) Assignee: Eco-Shred Ltd., Mississauga (CA)

(*) Notice: Subject to any disclaimer, the term of this patent is extended or adjusted under 35 U.S.C. 154(b) by 69 days.

(21) Appl. No.: 09/708,037

(22) Filed: Nov. 8, 2000

(30) Foreign Application Priority Data

Oct. 19, 2000 (CA) ........................................ 2323825

(51) Int. Cl.[7] ........................................ B02C 23/08

(52) U.S. Cl. ........................ 241/24.29; 241/27; 241/79; 241/236

(58) Field of Search ............................ 241/24.1, 24.29, 241/27, 79, 186.35, 236, DIG. 38

(56) References Cited

U.S. PATENT DOCUMENTS 3,070,318 A * 12/1962 Blanchard .................... 241/14
4,072,273 A * 2/1978 Reiniger ...................... 241/19
4,162,768 A * 7/1979 Froats ......................... 241/45
5,513,805 A * 5/1996 Fisher et al. ............. 241/24.29
5,645,229 A * 7/1997 Spencer et al. ............... 241/20

* cited by examiner

*Primary Examiner*—John M. Husar
(74) *Attorney, Agent, or Firm*—Dimock Stratton Clarizio; Mark B. Eisen

(57) ABSTRACT

A mechanical system that separates bundles of paper and presents the separated paper on a conveyor in a single layer fashion, for further processing. The paper is accumulated in a hopper and fed into the mechanical separating mechanism in a batch mode. When sufficient volume has been admitted to the container, the inflow port is closed and the mechanical separating impeller are activated to rotate in the same direction, imparting bidirectional forces on compacted bundles of sheets or shreds, causing them to deaggregate. Upon completion of the separation cycle, the separated sheets are expelled through an outlet port and conveyed to a drop chute for further singulation, from which the singulated sheets may be deposited onto one or more conveyor belts for sorting.

20 Claims, 1 Drawing Sheet

10
12
14
14a
16
2
20
22
24
25
26
27
28
30
4
32
32a
34
36
6
40
42

PAPER SEPARATION AND SINGULATION APPARATUS AND METHOD

FIELD OF INVENTION

The present invention relates to materials processing. In particular, the present invention relates to a paper separation and singulation apparatus and method, for the separation of shredded paper and the presenting of the separated paper shreds to a belt conveyor in a single layer fashion for further sorting.

BACKGROUND OF THE INVENTION

In the sorting of recyclable paper, whether on the basis of color or another property, paper shreds need to be singulated before they can be presented to a sensor for detection of the property of interest. If multiple shreds are conveyed past the sensor, only the top sheet, which is the shred exposed to the sensor, will be detected, and the entire bundle or pile of shreds will be classified according to the top sheet. This will result in both contamination of a superior grade of paper and loss of superior grade paper to an inferior paper grade batch.

In a paper recycling plant a throughput in the order of millions of shreds per hour is essential for economic viability. Such a magnitude is unattainable by manual singulation of shreds. Accordingly, in order to provide effective separation of paper grades at an economically viable rate, automation of the separation process is essential.

The use of automatic singulation in sorting objects has been disclosed in several patents pertaining to the food industry. However, there is presently no effective automatic method of singulating paper shreds for sorting.

SUMMARY OF THE INVENTION

The present invention relates to an automatic paper separation apparatus and method which separates compacted paper sheets or shreds from one another for conveyance in separated or singulated form to a sensor for sorting.

The system of the invention comprises a hopper for collection of bundles of paper sheets or shreds and their regulated deposition onto an infeed conveyor. Preferably the conveyor is oriented in such a way that it slopes upwardly at a predetermined angle, to allow the paper shreds to fall from the terminal end of the conveyor at an elevation which is higher than the point of entry, into a paper fluffing apparatus.

The paper fluffing apparatus comprises a batch fluffer, comprising a vessel positioned downstream of the infeed conveyor belt containing a pair of impellers rotating in opposite directions and at selected speeds. The rotation of the impellers subjects compacted bundles of paper shreds to bidirectional forces which overcome both frictional and binding forces within the bundle of shreds, resulting in the separation and singulation of the paper bundles.

In the preferred embodiment the batch fluffer deposits the deaggregated paper sheets or shreds into a surge hopper, which deposits a selected batch volume of deaggregated paper sheets or shreds onto a surge conveyor, also preferably sloping upwardly at a predetermined angle. The surge conveyor feeds the paper sheets or shreds into a drop chute, which further singulates the deaggregated paper shreds by air resistance opposing the acceleration of the paper through the drop chute.

The fluffing apparatus of the invention thus overcomes the coalescence between compacted shreds of paper, separating and substantially singulating the paper shreds for subsequent sorting.

The present invention thus provides a paper separation apparatus for separating bundles of paper sheets or shreds, comprising a receiving hopper for depositing regulated batches of the bundles onto an infeed conveyor, a batch fluffer positioned adjacent to a terminal end of the infeed conveyor, comprising a vessel and a pair of adjacent impellers having blades adapted for rotation at selected speeds, wherein rotation of the impellers subjects the bundles to bidirectional forces which overcome frictional and binding forces within the bundles and separates the paper sheets or shreds into deaggregated paper sheets or shreds.

The present invention further provides a method of separating bundles of paper sheets or shreds, comprising the steps of a, depositing regulated batches of the bundles into a receiving hopper, b. conveying the batches to a fluffing apparatus comprising a vessel and a pair of adjacent impellers having blades adapted for rotation at selected speeds, and c. rotating the impellers to subject the bundles to bidirectional forces which overcome frictional and binding forces within the bundles to deaggregate the paper sheets or shreds.

In further aspects of the apparatus and method of the invention: the batch fluffer deposits the deaggregated paper sheets or shreds into a surge hopper for conveyance to a sorting station; the deaggregated paper sheets or shreds are deposited into a drop chute for deposit onto a sorting stage; the surge hopper deposits the deaggregated paper sheets or shreds onto a surge conveyor for conveyance to the drop chute; the surge conveyor slopes upwardly; the infeed conveyor slopes upwardly; the blades are substantially planar; the impellers are disposed in overlapping relation; the impellers rotate in the same direction; and/or the outlet closure substantially conforms to the rotational profile of the impellers.

BRIEF DESCRIPTION OF THE DRAWINGS

In drawings which illustrate by way of example only a preferred embodiment of the invention.

DETAILED DESCRIPTION OF THE INVENTION

Figure 1:
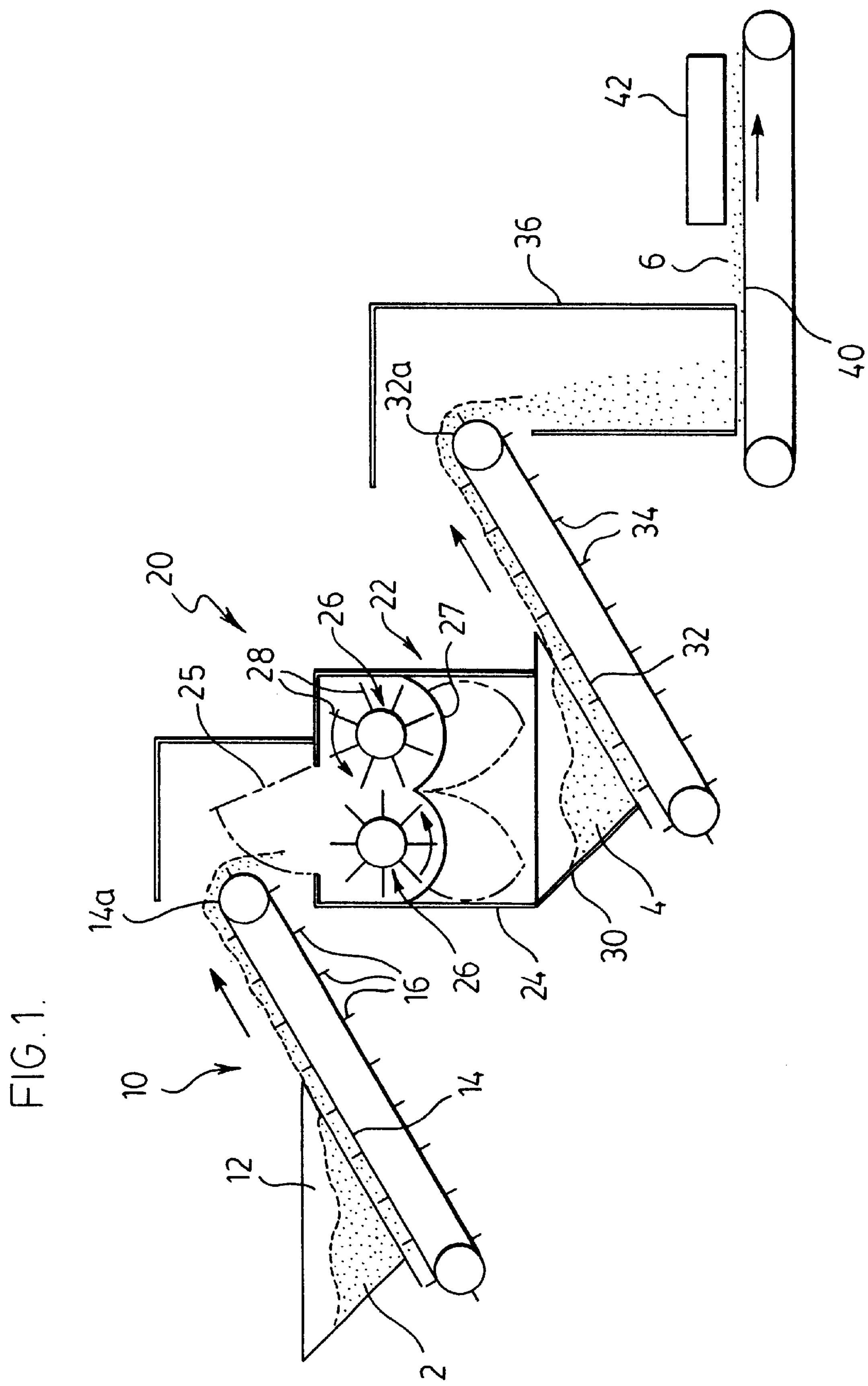
FIG. 1 is a schematic elevation of a paper sorting and singulation system according to the invention.

The system of the invention comprises a feeding system 10 and a singulation system 20. The invention will be described in relation to its use for the separation and singulation of bundles 2 of shredded paper, however the invention can be equally applied to the separation and singulation of whole sheets of paper and the invention is not intended to be limited thereby.

The feeding system 10 comprises a receiving hopper 12 for the collection of compressed bundles of paper shreds 2. The receiving hopper 12 has an outlet disposed above an infeed conveyor 14 comprising sectional dividers 16 which extend substantially between the conveyor 14 and the outlet of the hopper 12, dividing the conveyor 14 into sections which define a batch volume for the regulated deposition of the shred bundles 2 onto the infeed conveyor 14. Preferably the infeed conveyor 14 is oriented to slope upwardly at a predetermined angle, optimally approximately 30° from the horizontal so that the bundles 2 of paper shreds fall from the terminal end 14*a* of the conveyor 14 at an elevation which is higher than the point of entry, to control the volume of batches on the infeed conveyor 14 by allowing paper shreds which pile up above the height of the dividers 60 to fall into the next upstream section under the influence of gravity.

The paper fluffing apparatus 20 is disposed beneath the terminal end 14*a* of the infeed conveyor 14. The paper fluffing apparatus 20 comprises a batch fluffer 22 comprising a vessel 24 having an inlet closure 25 and an outlet closure 27, both shown in the closed position in solid lines and in the open position phantom lines in FIG. 1. The vessel 24 contains a pair of impellers 26 having preferably planar blades 28. The impellers 26 are disposed adjacent to one another, preferably in slightly overlapping relation, and preferably rotating in the same direction at selected speeds, to deaggregate the compressed paper shred bundles 2. The outlet closure 27 preferably substantially conforms to the rotational profile of the impellers 26, leaving only a slight clearance therebetween, to recapture paper shreds which have fallen through the impellers 26 and carry them back up toward the inlet for further separation.

In the preferred embodiment the outlet of the batch fluffer 22 is disposed above a surge hopper 30, which in turn is disposed above a surge conveyor 32, also sloping upwardly at a predetermined angle and having sectional dividers 34 separating the conveyor 32 into sections which define a batch volume of deaggregated shreds 4, to regulate the deposition of the deaggregated shred batches onto the surge conveyor 32.

The terminal end 32*a* of the surge conveyor 32 is in communication with a drop chute 36, which is disposed above a sorting conveyor 40 comprising a detection system 42 to detect the desired characteristic for sorting, for example color.

In operation, the receiving hopper 12 is loaded with compressed bundles 2 of paper shreds, which may be deposited into the hopper 12 manually or by any suitable automatic conveying system. The receiving hopper 12 deposits the compressed paper shreds onto the infeed conveyor 14, in batch volumes determined by the spacing between sectional dividers 16. The infeed conveyor 14 thus deposits the compressed shred bundles 2 into the paper fluffing apparatus 20 at a regulated rate.

The compressed shred bundles are deposited into the batch fluffer 22 through inlet 25. When the desired batch volume of shred bundles 2 has been deposited into the batch fluffer 22, the inlet 25 of the vessel 24 is closed and the impellers 26 are activated. The rotation of the impeller blades 28 subjects compacted bundles 2 of paper shreds to bidirectional forces which overcome both frictional and binding forces within the compressed bundles 2, resulting in deaggregation of the paper shred bundles 2 in the vessel 24.

After the fluffing cycle the outlet 27 is opened and the batch fluffer 22 deposits the deaggregated paper shreds 4 into the surge hopper 30, which deposits batches of the deaggregated paper shreds 4 onto surge conveyor 32. The surge conveyor 32 in turn feeds the deaggregated paper shreds 4 into the drop chute 36, which further singulates the deaggregated paper shreds through air resistance opposing the falling motion of the paper shreds 4 through the drop chute 36.

The fluffing apparatus thus overcomes the coalescence between compacted shreds of paper, substantially singulating the paper shreds into individual pieces 6 for subsequent sorting.

A preferred embodiment of the invention having been thus described by way of example only, it will be apparent to those skilled in the art that certain modifications and adaptations may be made without departing from the scope of the invention, as set out in the appended claims.

What is claimed is:

1. A paper separation apparatus for separating bundles of paper sheets or paper shreds, comprising a receiving hopper for depositing regulated batches of the bundles onto an infeed conveyor, a batch fluffer positioned adjacent to a terminal end of the infeed conveyor, comprising a vessel and a pair of adjacent impellers having blades adapted for rotation at selected speeds, wherein rotation of the impellers subjects the bundles to bidirectional forces which overcome frictional and binding forces within the bundles and separates the paper sheets or paper shreds into deaggregated paper sheets or paper shreds.

2. The paper separation apparatus as defined in claim 1 in which the batch fluffer deposits the deaggregated paper sheets or paper shreds into a surge hopper for conveyance to a sorting station.

3. The paper separation apparatus as defined in claim 2 in which the deaggregated paper sheets or paper shreds are deposited into a drop chute for deposit onto a sorting stage.

4. The paper separation apparatus as defined in claim 3 in which the surge hopper deposits the deaggregated paper sheets or paper shreds onto a surge conveyor for conveyance to the drop chute.

5. The paper separation apparatus as defined in claim 4 in which the surge conveyor slopes upwardly.

6. The paper separation apparatus as defined in claim 1 in which the infeed conveyor slopes upwardly.

7. The paper separation apparatus as defined in claim 1 in which the blades are substantially planar.

8. The paper separation apparatus as defined in claim 7 in which the impellers are disposed in overlapping relation.

9. The paper separation apparatus as defined in claim 1 in which the impellers rotate in the same direction.

10. The paper separation apparatus as defined in claim 1 in which the outlet closure substantially conforms to the rotational profile of the impellers.

11. A method of separating bundles of paper sheets or paper shreds, comprising the steps of a. depositing regulated batches of the bundles into a receiving hopper, b. conveying the batches to a fluffing apparatus comprising a vessel and a pair of adjacent impellers having blades adapted for rotation at selected speeds, and c. rotating the impellers to subject the bundles to bidirectional forces which overcome frictional and binding forces within the bundles to deaggregate the paper sheets or paper shreds.

12. The method as defined in claim 11 including the further step of d. depositing the deaggregated paper sheets or paper shreds into a surge hopper for conveyance to a sorting station.

13. The method as defined in claim 12 including the further step of e. depositing the deaggregated paper sheets or paper shreds into a drop chute for deposit onto sorting stage.

14. The method as defined in claim 13 in which the surge hopper deposits the deaggregated paper sheets or paper shreds onto a surge conveyor for conveyance to the drop chute.

15. The method as defined in claim 14 in which the surge conveyor slopes upwardly.

16. The method as defined in claim 11 in which the infeed conveyor slopes upwardly.

17. The method as defined in claim 11 in which the blades are substantially planar.

18. The method as defined in claim 17 in which the impellers are disposed in overlapping relation.

19. The method as defined in claim 11 in which the impellers rotate in the same direction.

20. The method as defined in claim 11 in which the outlet closure substantially conforms to the rotational profile of the impellers.

* * * * *